United States Patent
Jin et al.

(10) Patent No.: US 8,553,393 B2
(45) Date of Patent: Oct. 8, 2013

(54) COIN TYPE LITHIUM ION CAPACITOR

(75) Inventors: Chang Soo Jin, Daejeon (KR); Wook Ahn, Daejeon (KR); Kyoung Hee Shin, Seoul (KR); Kyu Nam Jung, Daejeon (KR); Bum Suk Lee, Daejeon (KR); Myung Seok Jeon, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 194 days.

(21) Appl. No.: 13/247,454

(22) Filed: Sep. 28, 2011

(65) Prior Publication Data
US 2012/0075771 A1    Mar. 29, 2012

(30) Foreign Application Priority Data
Sep. 28, 2010   (KR) .................... 10-2010-0093721

(51) Int. Cl.
     *H01G 9/00*      (2006.01)
(52) U.S. Cl.
     USPC ........... 361/502; 361/503; 361/504; 361/512; 361/517; 361/519
(58) Field of Classification Search
     USPC ......... 361/502, 503, 504, 509, 512, 516–519, 361/523–525, 528–529
     See application file for complete search history.

(56) References Cited

U.S. PATENT DOCUMENTS

| | | | | |
|---|---|---|---|---|
| 6,043,975 | A * | 3/2000 | Kanbara et al. | 361/502 |
| 6,862,168 | B2 * | 3/2005 | Ando et al. | 361/504 |
| 7,426,103 | B2 * | 9/2008 | Nozu et al. | 361/502 |
| 7,697,264 | B2 * | 4/2010 | Tasaki et al. | 361/502 |
| 7,848,081 | B2 * | 12/2010 | Tanizaki et al. | 361/525 |
| 8,004,823 | B2 * | 8/2011 | Taguchi et al. | 361/502 |
| 8,310,810 | B2 * | 11/2012 | Hiroi et al. | 361/502 |

FOREIGN PATENT DOCUMENTS

| | | |
|---|---|---|
| KR | 10-2008-0014271 A | 2/2008 |
| KR | 10-2008-0035964 A | 4/2008 |
| KR | 10-2008-0072712 A | 8/2008 |
| KR | 10-2009-0086153 A | 8/2009 |

OTHER PUBLICATIONS

Wang, Hongyu, et al., "Effect of cation on the performance of AC / graphite capacitor", Electrochemistry Communications, 2008, pp. 382-386, vol. 10.
Khomenko, V., et al., "High-energy density graphite / AC capacitor in organic electrolyte" Journal of Power Sources, 2008, pp. 643-651, vol. 177.
Korean Patent Office, Korean Office Action issued in corresponding KR Application No. 10-2010-0093721, dated Nov. 23, 2011.

* cited by examiner

*Primary Examiner* — Nguyen T Ha
(74) *Attorney, Agent, or Firm* — Sughrue Mion, PLLC

(57) ABSTRACT

Disclosed is a coin type lithium ion capacitor which includes a positive electrode made of an activated carbon based positive active material and a negative electrode opposite to the positive electrode with a first separator interposed therebetween. The negative electrode includes a graphite electrode including a first current collector and a graphite based negative active material coated onto the first current collector; and a lithium metal member opposite to the graphite electrode with a second separator interposed therebetween and including a second current collector and lithium metal coated on the second current collector, in which lithium ions of the lithium metal move from the lithium metal to the positive electrode through the graphite electrode during discharge and are carried in the graphite electrode from the positive electrode during charge.

18 Claims, 2 Drawing Sheets

ES: 240, 250, 260

COIN TYPE LITHIUM ION CAPACITOR

CROSS-REFERENCE TO RELATED APPLICATIONS

This application claims priority under 35 U.S.C. §119 to Korean Patent Application No. 10-2010-0093721, filed on Sep. 28, 2010, in the Korean Intellectual Property Office, the disclosure of which is incorporated herein by reference in its entirety.

TECHNICAL FIELD

The present invention relates to a coin type lithium ion capacitor, and more particularly, to a coin type lithium ion capacitor having a high capacity coin type structure which has high energy density and output density and improves stability.

BACKGROUND

In recent years, a battery in which carbon material such as graphite is used as a negative electrode material and a lithium-containing metallic oxide such as $LiCoO_2$ is used as a positive electrode material has been suggested. The battery is called a rocking chair battery in which after assembling cells, lithium ions are supplied from the lithium-containing metallic oxide of the positive electrode to the negative electrode by charging the cells and during discharge, the lithium ions of the negative electrode are transferred back to the positive electrode. In other words, the battery is called a lithium-ion rechargeable battery in which only the lithium ions are involved in the charge and discharge without using metallic lithium in the negative electrode, and is distinguished from a lithium battery using the metallic lithium. The battery is characterized by high voltage, capacity, and stability.

With environmental issues coming to the forefront, a storage system for clean energy obtained by photovoltaic power generation or wind power generation or a power supply for an electric vehicle or hybrid electric vehicle substituting for a gasoline vehicle is being developed. As vehicle mounted apparatuses or equipment such as power windows or IT-related machines recently have high performance and high function, a new power supply is needed in view of energy density and output density.

As an electric storage device that responds to such applications that necessitate high energy density and high output characteristics, recently, an electric storage device called a hybrid capacitor in which electric storage principles of a lithium ion rechargeable battery and an electric double layer capacitor s gathering attention. As one of the hybrid capacitors, an organic electrolyte capacitor has been suggested, which uses for a negative electrode a carbon material capable of significantly increasing energy density by allowing the carbon material that can store and release lithium ions to store and carry (hereinafter, in some cases, referred to as "pre-doping") the lithium ions chemically or electrochemically in advance to thereby lower a negative electrode potential.

Recently, the demand for a high capacity organic electrolyte capacitor with improved stability which has higher energy density and output density gradually increases, and particularly, the demand for a lithium ion capacitor which may be used in the range of 4.2 V to 4.4 V has gradually increased, but a research on the capacitor is not actively being conducted.

Therefore, it is urgent to develop a 4.2 V to 4.4 V lithium ion capacitor having high energy density and output density.

A coin type battery is useful in terms of utilization and basically has a two-electrode structure. Therefore, there is a problem in that after a complicated pre-doping process, a process of disassembling a battery to remove a lithium metallic electrode and reassembling the other electrode is required in a manufacturing process.

SUMMARY

An exemplary embodiment of the present invention provides a coin type lithium ion capacitor, including: a positive electrode made of an activated carbon based positive active material; and a negative electrode opposite to the positive electrode with a first separator interposed therebetween. The negative electrode may include a graphite electrode including a first current collector and a graphite based negative active material coated onto the first current collector; and a lithium metal member opposite to the graphite electrode with a second separator interposed therebetween and including a second current collector and a lithium metal coated on the second current collector, in which lithium ions of the lithium metal move from the lithium metal to the positive electrode through the graphite electrode during discharge and are carried in the graphite electrode from the positive electrode during charge.

Another exemplary embodiment of the present invention provides a coin type lithium ion capacitor, including: a positive electrode including an activated carbon based positive active material; and a negative electrode opposite to the positive electrode with a first separator interposed therebetween, in which the negative electrode includes a graphite electrode including a first current collector and a graphite based negative active material coated onto the first current collector; and a lithium metal member opposite to the graphite electrode with a second separator interposed therebetween and including a second current collector and a lithium metal coated on the second current collector, in which lithium ions of the lithium metal move from the lithium metal to the positive electrode through the graphite electrode during discharge and are carried in the graphite electrode from the positive electrode during charge.

Other features and aspects will be apparent from the following detailed description, the drawings, and the claims.

DETAILED DESCRIPTION OF EMBODIMENTS

Figure 1:
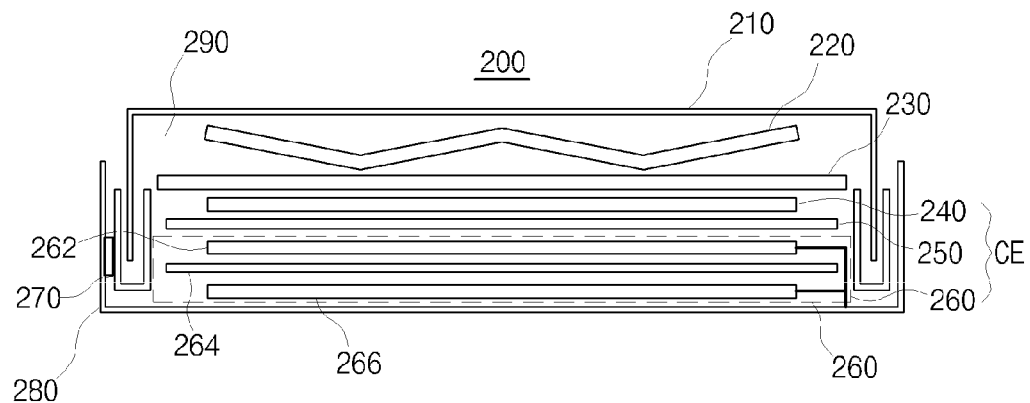
FIG. 1 is a schematic diagram showing a structure of a coin type lithium ion capacitor according to an exemplary embodiment of the present invention.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The present invention provides a lithium ion capacitor without the need for a pre-doping process, particularly, a lithium ion capacitor with a two-electrode structure which has a stable charge and discharge characteristic in a wide range of voltage by a self-discharge process and a cell-activation process instead of the pre-doping process.

To this end, the lithium ion capacitor according to the present invention has a two-electrode structure including a positive electrode made of an activated carbon based positive active material and a negative electrode formed of a graphite electrode capable of carrying lithium ions and a lithium metal member connected to the graphite electrode by a wire. The two-electrode structure does not need a pre-doping process of allowing a graphite to carry lithium ions which is used in a lithium ion capacitor of the related art.

The lithium ion capacitor of the present invention has a charge and discharge characteristic by a potential difference between the positive electrode and the negative electrode which is created through a self-discharge process (or an initial self-discharge process) and a cell-activation process and as a result, the pre-doping process is not needed. Therefore, the lithium ion capacitor can be manufactured without the additional pre-doping process because of the two-electrode structure and particularly, manufactured in a coin type which has wide applicability.

Herein, the self-discharge process refers to a process in which lithium ions naturally move from the lithium metal to the graphite electrode by the potential difference by electrochemical contact between the graphite electrode constituting the negative electrode and the lithium metal.

The cell-activation process refers to a process in which the lithium ions discharged during repeated charge/discharge between the graphite electrode and the activated carbon based positive electrode are not deposited as lithium metal but carried in the graphite when the lithium ions are charged in the graphite electrode after the self-discharge process.

Therefore, the present invention may provide the coin type lithium capacitor having high output and high capacity like the coin type cell of the related art used as a primary battery and a lithium rechargeable battery by the two-electrode structure having the negative electrode including the graphite electrode effectively carrying the lithium ions, and the activated carbon based positive electrode through the self-discharge process and the cell-activation process.

Meanwhile, during the cell-activation process, when the discharged lithium ions are not completely charged in the graphite electrode, the problem in that the lithium ions which are not charged but left are deposited may occur. In this case, there may be problems such as generation of gas due to a side reaction of the deposited lithium ions with an electrolytic solution filled in the lithium ion capacitor.

In the present invention, two methods for preventing the lithium ions from being deposited are suggested.

In the first method, a lithium metal member constituting the negative electrode includes a lithium metal current collector and lithium metal coated on the lithium metal current collector, in which the lithium metal is coated on the current collector at the amount of less than acceptable capacity of the graphite based negative active material constituting the graphite electrode. As a result, it is possible to prevent the lithium ions from being deposited. That is, when a full discharge between the lithium metal and the activated carbon based positive electrode is made, the lithium metal is coated on the lithium metal current collector at the amount obtained by analyzing the actually acceptable capacity so that no lithium metal is left.

In the second method, a current collector structurally constituting a graphite electrode is formed in a mesh type to allow lithium ions to diffuse through the graphite electrode coated on the mesh type current collector. In the negative electrode structure including the lithium metal member and the graphite electrode according to the present invention, since the lithium metal coated on the lithium metal current collector is provided at a lower portion of the graphite electrode, the lithium ions diffuse through the mesh type graphite electrode during discharge between the lithium metal and the activated carbon based positive electrode. Therefore, a predetermined amount of lithium ions diffuse to the activated carbon based positive electrode while being intercalated into the graphite electrode and as a result, the lithium ions are not deposited as the lithium metal again but carried into the graphite electrode during charge, that is, the lithium ions structurally exists in an $LiC_6$ form.

In the present invention, in order to minimize the deposition of the lithium metal, the respective electrodes are coated so that the electrodes have capacity in order of an activated carbon electrode (positive electrode), a graphite electrode (negative electrode), and lithium metal in designing the electrodes.

Hereinafter, an exemplary embodiment of the present invention will be described in detail with reference to the accompanying drawings.

Figure 2:
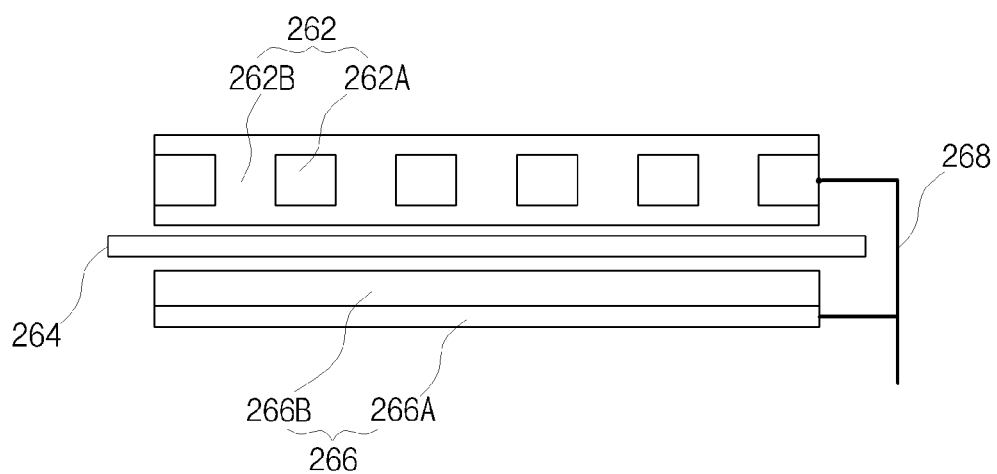
FIG. 2 is an expanded view showing a structure of a negative electrode shown in FIG. 1.

FIG. 1 is a schematic diagram showing a structure of a coin type lithium ion capacitor according to an exemplary embodiment of the present invention and FIG. 2 is an expanded view showing a structure of a negative electrode shown in FIG. 1.

Referring to FIGS. 1 and 2, a coin type lithium ion capacitor 200 according to an exemplary embodiment of the present invention includes an upper case 210, a lower case 280 coupled with the upper case 210 to form a receiving space inside, and an electrochemical cell ES received in the receiving space. A gasket 270 is installed at an end of a side wall of the upper case to seal a coupling portion of the upper case 210 and the lower case 280. The receiving space further includes a spacer 230 and a spring member 220 interposed between the upper case 210 and the electrochemical cells ES to maintain a predetermined distance between the upper case 210 and the electrochemical cells ES.

The electrochemical cell ES is received in the receiving space and an electrolytic solution is filled in the rest of the receiving space. The electrolytic solution may be composed of a non-protonic organic solvent and an electrolyte of a lithium salt and as the organic solvent, one or two kinds or more of ethylene carbonate, propylene carbonate, butylene carbonate, γ-butyrolactone, 1,2-dimethoxyethane, 1,3-dioxolane, dimethyl carbonate, ethyl methyl carbonate, and diethyl carbonate may be mixed and as the lithium salt, one of $LiBF_4$, $LiClO_4$, $LiPF_6$, $LiCF_3SO_3$, $Li(CF_3SO_2)2N$ may be used.

The electrochemical cell ES includes a positive electrode 240 made of an activated carbon based positive active material and a negative electrode 260 opposite to the positive electrode 240 with a first separator 250 interposed therebetween.

The positive electrode 240 is made of a positive active material that is coated on a current collector (not shown) (hereinafter, referred to as "cathode current collector") to reversibly carry lithium ions and anions and an activated carbon may be used as the positive active material. A conductive material such as acetylene black and a metal powder may be used as a conducting material used in manufacturing the positive electrode. The conducting material may be applied at the ratio of 1% to 50% of the positive active material. In the case where the activated carbon is in a powder form, a binder material may be used to coat the activated carbon in a powder form onto the cathode current collector. For example, rubber binders such as SBR, fluorine-containing resins such as polytetrafluoroethylene (PTEE) and polyvinylidene fluoride (PVDF), acrylic resins, and thermoplastic resins may be used.

The negative electrode 260 includes a graphite electrode 262, a second separator 264, and a lithium metal member 266.

Specifically, as shown in FIG. 2, the graphite electrode 262 includes a first current collector 262A and a negative active material 262B coated on the first current collector 262A. The first current collector 262A has a mesh type shape in which a plurality of through-holes are formed.

The mesh type shape allows the lithium ions generated from the lithium metal member 266 to smoothly move (or diffuse) to the positive electrode through the first current collector 262A. The negative active material 262B can reversibly carry the lithium ions generated from the lithium metal member 266 and may use a graphite material such as graphite and hard carbon. The graphite based negative active material is coated onto the mesh type first current collector 262A to constitute the graphite electrode 262.

The lithium metal member 266 is provided opposite to the graphite electrode with the second separator 264 interposed therebetween. The lithium metal member 266 includes a second current collector 266A and lithium metal 266B coated onto the second current collector 266A. As described above, in order to prevent the lithium ions generated from the lithium metal 266B from being completely carried in the graphite electrode 262 and deposited as lithium metal, the lithium metal 266B may be coated on the second current collector 266A at the amount of less than the acceptable capacity of the graphite based negative active material 262B.

As described above, according to the exemplary embodiment of the present invention, in order to design the lithium ion capacitor in a coin type having a two-electrode structure, the graphite electrode 262 and the lithium metal member 266 are electrically connected by a wire 268 to constitute a single cell, in which the single cell acts as a negative electrode.

After assembling cells, the lithium ions repeatedly diffuse to the cathode and the anode (for example, 5 cycles) through charge and discharge processes as the initial high-temperature self-discharge process and the cell-activation process and finally are carried in the graphite as the anode.

The coin type lithium ion capacitor of the present invention can prevent gas from being generated by a side reaction of the activated carbon as the positive active material and the lithium metal with the electrolytic solution at 4.2 V or more.

The reason is that all the lithium metal 266B engaging with the graphite electrode 260 constituting the negative electrode is intercalated into the cathode to be consumed and as a result, the gas is prevented from being generated by the side reaction with the electrolytic solution, which makes it possible to stably drive cells even at 4.2 V or more.

As such, the lithium ion capacitor of the present invention has the two-electrode structure with the positive electrode and the negative electrode opposite to the positive electrode, in which the negative electrode is formed in a structure having the graphite electrode and the lithium metal which are connected by the wire.

By having the structure, the lithium ion capacitor can provide stability and very high energy density and output density by the self-discharge process and the cell-activation process without the pre-doping process in manufacturing the capacitor.

Meanwhile, the lithium ion capacitor can be charged and discharged even in a structure having the lithium metal and the positive electrode without the graphite electrode shown in FIG. 1. However, when the lithium ion capacitor is manufactured to have the structure, there is a problem in that the charge and discharge characteristic is lost at very high voltage, for example, 4.2 V or more.

Figure 3:
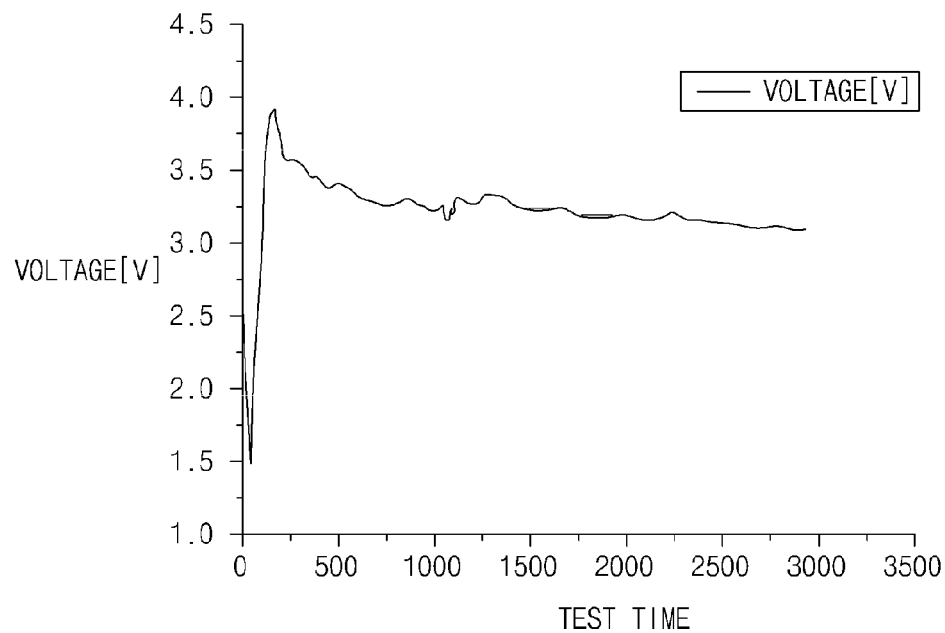
FIG. 3 is a graph showing a charge profile of a lithium ion capacitor having a half cell structure in which a graphite electrode shown in FIG. 1 is removed and a positive electrode and only a lithium metal as a counter electrode of the positive electrode are included.

FIG. 3 is a graph showing a charge profile of a lithium ion capacitor having a half cell structure in which a graphite electrode shown in FIG. 1 is removed and the positive electrode and only a lithium metal as a counter electrode of the positive electrode are included.

As shown in FIG. 3, it is confirmed that in the lithium ion capacitor having the half structure, the voltage does not reach 4.0 V, such that the charge and discharge characteristic is fully lost. The phenomenon results from the instability of the lithium metal. Particularly, gas is generated by a side reaction between the lithium metal and the electrolytic solution during charge and the charge and discharge characteristic is lost due to the generated gas.

Based on the fact, the present invention provides a charge and discharge characteristic which is stable even at 4.2 V or more by including the graphite electrode carrying the lithium ions generated from the lithium metal between the positive electrode and the lithium metal.

Figure 4:
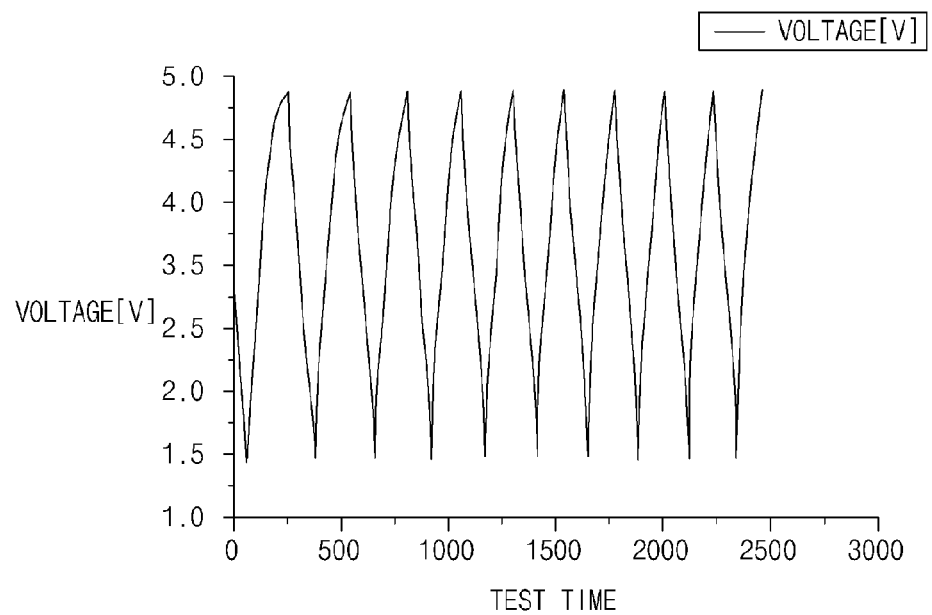
FIG. 4 is a graph showing a charge and discharge profile of a lithium ion capacitor according to an exemplary embodiment of the present invention.

FIG. 4 is a graph showing a charge and discharge profile of the lithium ion capacitor according to the exemplary embodiment of the present invention. In the exemplary embodiment, a $16^{-a}$ electrode in which a positive electrode made of the positive active material formed on a current collector has a thickness of 250 um was used and $16^{-a}$ electrode in which a negative electrode made of the negative active material formed on the other current collector has a thickness of 180 um was used. The $16^{-a}$ electrode was designed to have a lithium metal member made of lithium metal formed on the current collector with a thickness of 100 um. The graphite electrode and the lithium metal were connected by a wire to be used as a single electrode.

Cells were manufactured to have a weight ratio of a cathode to an anode of 1:1, 2:1, and 3:1, respectively and were subjected to a test. In self-discharge and activation processes of cells, coin cells were manufactured and allowed to be left in an oven of 60° C. for 48 hours so that lithium ions were self-discharged to the anode by a physical contact in the manufactured cell. The lithium ions were diffused by electrochemically bringing the cathode into contact with the anode/lithium metal electrode so that in the coin cell subjected to the self-discharge process, the lithium ions from the lithium metal as a lithium ion source are carried in the anode. In the initial activation process, an electrochemical activation step was performed by 1.5 to 4.5 V.

The lithium metal was completely consumed after performing the initial charge and discharge processes ten times and intercalated into the graphite based negative active material. Consequently, no lithium metal was left.

The coin type lithium ion capacitor subjected to the cell activation step showed a stable charge and discharge curve.

That is, as shown in FIG. 4, it was confirmed that a rising slope around a peak value is changed from a smooth curve to a steep curve as time elapses.

However, as shown in FIG. 3, since the half cell using only the activated carbon showed an instable phenomenon due to the side reaction of the activated carbon and the lithium metal with the electrolytic solution during charge at 4.2 V or more, the coin type lithium ion capacitor has higher stability than the half cell using the activated carbon and is industrially applicable.

It was confirmed that the case where the weight ratio of cathode to anode is 3:1 had higher capacity compared to the cases where the weight ratios are 2:1 and 1:1 and consequently, it can be seen that the capacity of the coin type lithium ion capacitor is determined by the cathode.

According to the exemplary embodiment of the present invention, it is possible to provide a coin type lithium ion capacitor having stability of a coin type typified by a two-electrode structure and high energy density and output density by a self-discharge process and a cell-activation process without a pre-doping process.

From the foregoing, it will be appreciated that various embodiments of the present disclosure have been described herein for purposes of illustration, and that various modifications and changes may be made without departing from the scope and spirit of the present disclosure. For example, in the exemplary embodiment, the coin type lithium ion capacitor having the two-electrode structure is mainly described, but the present invention may include another type of lithium ion capacitor in addition to the coin type. Accordingly, the various embodiments disclosed herein are not intended to be limiting, with the true scope and spirit being indicated by the following claims.

What is claimed is:

1. A coin type lithium ion capacitor containing an organic solvent electrolyte, comprising:
   a positive electrode including an activated carbon based positive active material;
   a graphite electrode opposite to the positive electrode with a first separator interposed therebetween and including a first current collector and a graphite based negative active material coated onto the first current collector; and
   a lithium metal member opposite to the graphite electrode with a second separator interposed therebetween and connected to the graphite electrode by a wire to serve as a negative electrode together with the graphite electrode.

2. The coin type lithium ion capacitor of claim 1, wherein the lithium metal member includes a second current collector and lithium metal coated on the second current collector and lithium ions of the lithium metal move to the positive electrode through the graphite electrode during discharge and are carried in the graphite electrode from the positive electrode during charge.

3. The coin type lithium ion capacitor of claim 2, wherein the first current collector is a mesh type having a plurality of through-holes so that the lithium ions are smoothly transferred from the graphite electrode to the positive electrode.

4. The coin type lithium ion capacitor of claim 1, wherein the first current collector is a mesh type having a plurality of through-holes so that the lithium ions are smoothly transferred from the graphite electrode to the positive electrode.

5. The coin type lithium ion capacitor of claim 1, wherein as the organic solvent, one or two kinds or more of ethylene carbonate, propylene carbonate, butylene carbonate, γ-butyrolactone, 1,2-dimethoxyethane, 1,3-dioxolane, dimethyl carbonate, ethyl methyl carbonate, and diethyl carbonate are mixed and used.

6. The coin type lithium ion capacitor of claim 1, wherein as the lithium salt of the electrolytic solution, one of $LiBF_4$, $LiClO_4$, $LiPF_6$, $LiCF_3SO_3$, $Li(CF_3SO_2)2N$ is used.

7. The coin type lithium ion capacitor of claim 1, wherein the lithium ion capacitor is charged and discharged with reversible potential at 1.5 V to 4.5 V relative to the lithium ions.

8. The coin type lithium ion capacitor of claim 1, wherein the lithium ion capacitor has a shape of a coin.

9. A coin type lithium ion capacitor containing an organic solvent electrolyte, comprising:
   a positive electrode including an activated carbon based positive active material: and
   a negative electrode opposite to the positive electrode with a first separator interposed therebetween,
   wherein the negative electrode includes:
   a graphite electrode including a first current collector and a graphite based negative active material coated onto the first current collector; and
   a lithium metal member opposite to the graphite electrode with a second separator interposed therebetween and including a second current collector and lithium metal coated on the second current collector, in which lithium ions of the lithium metal move from the lithium metal to the positive electrode through the graphite electrode during discharge and are carried in the graphite electrode from the positive electrode during charge.

10. The coin type lithium ion capacitor of claim 9, wherein the lithium metal coated on the second current collector is coated onto the second current collector at the amount of less than acceptable capacity of the graphite based negative active material so as to prevent the lithium ions from being deposited as the lithium metal again while not being carried in the graphite electrode during charge.

11. The coin type lithium ion capacitor of claim 9, wherein in relative capacity of the positive electrode and the negative electrode, the capacity of the graphite based negative active material is less than the capacity of the activated carbon based positive active material and larger than the capacity of the lithium metal.

12. The coin type lithium ion capacitor of claim 9, wherein in the relative capacity ratio of the positive electrode and the negative electrode, the activated carbon based positive active material and the graphite based negative active material have the capacity ratio of 100% to 500%, respectively, relative to the capacity of the lithium metal.

13. The coin type lithium ion capacitor of claim 9, further comprising:
   a wire connecting the graphite electrode and the metal member,
   wherein the graphite electrode and the metal member form a single negative electrode by the wire.

14. The coin type lithium ion capacitor of claim 9, wherein the first current collector is a mesh type having a plurality of through-holes so that the lithium ions are smoothly transferred from the graphite electrode to the positive electrode.

15. The coin type lithium ion capacitor of claim 9, wherein as the organic solvent, one or two kinds or more of ethylene carbonate, propylene carbonate, butylene carbonate, γ-butyrolactone, 1,2-dimethoxyethane, 1,3-dioxolane, dimethyl carbonate, ethyl methyl carbonate, and diethyl carbonate are mixed and used.

16. The coin type lithium ion capacitor of claim 9, wherein as the lithium salt of the electrolytic solution, one of $LiBF_4$, $LiClO_4$, $LiPF_6$, $LiCF_3SO_3$, $Li(CF_3SO_2)2N$ is used.

17. The coin type lithium ion capacitor of claim 9, wherein the lithium ion capacitor is charged and discharged with reversible potential at 1.5 V to 4.5 V relative to the lithium ions.

18. The coin type lithium ion capacitor of claim 9, wherein the lithium ion capacitor has a shape of a coin.

* * * * *